(12) United States Patent
Demers (10) Patent No.: US 9,353,974 B2
(45) Date of Patent: May 31, 2016

(54) SOLAR COLLECTING DEVICE

(76) Inventor: Daniel Demers, Weare, NH (US)

( * ) Notice: Subject to any disclaimer, the term of this patent is extended or adjusted under 35 U.S.C. 154(b) by 982 days.

(21) Appl. No.: 13/459,754

(22) Filed: Apr. 30, 2012

(65) Prior Publication Data

US 2013/0284236 A1     Oct. 31, 2013

(51) Int. Cl.
| | |
|---|---|
| *F24J 2/14* | (2006.01) |
| *F24J 2/38* | (2014.01) |
| *F24J 2/54* | (2006.01) |
| *F24J 2/52* | (2006.01) |
| *H02S 20/30* | (2014.01) |
| *H02S 20/10* | (2014.01) |
| *G02B 5/10* | (2006.01) |

(52) U.S. Cl.
CPC .. *F24J 2/542* (2013.01); *F24J 2/14* (2013.01); *F24J 2/38* (2013.01); *F24J 2/5201* (2013.01); *F24J 2/523* (2013.01); *H02S 20/10* (2014.12); *H02S 20/30* (2014.12); *H02S 20/32* (2014.12); *G02B 5/10* (2013.01); *Y02E 10/45* (2013.01); *Y02E 10/47* (2013.01); *Y02E 10/52* (2013.01)

(58) Field of Classification Search
CPC ............. F24J 2/38; F24J 2/542; F24J 2/14; F24J 2/52; F24J 2/5201; F24J 2/523–2/5239; F24J 2/5273; H02S 20/10; H02S 20/30; H02S 20/31; H02S 20/32; Y02E 10/45; Y02E 10/47; Y02E 10/52
USPC .................................................. 136/243–265
See application file for complete search history.

(56) References Cited

U.S. PATENT DOCUMENTS

| | | | | |
|---|---|---|---|---|
| 4,423,718 A | * | 1/1984 | Garrison | 126/655 |
| 4,700,013 A | | 10/1987 | Soule | |
| 4,720,170 A | * | 1/1988 | Learn, Jr. | 359/597 |
| 5,005,958 A | | 4/1991 | Winston et al. | |
| 5,069,540 A | * | 12/1991 | Gonder | F24J 2/1057 126/651 |
| 5,373,839 A | * | 12/1994 | Hoang | F24J 2/045 126/600 |
| 6,530,369 B1 | | 3/2003 | Yogev et al. | |
| 7,343,913 B2 | | 3/2008 | Niedermeyer | |
| 7,825,327 B2 | | 11/2010 | Johnson et al. | |
| 7,851,693 B2 | | 12/2010 | Fork et al. | |
| 7,855,335 B2 | | 12/2010 | Maeda | |
| 7,928,316 B2 | | 4/2011 | Young et al. | |
| 7,932,461 B2 | | 4/2011 | Johnson et al. | |
| 8,063,300 B2 | | 11/2011 | Horne et al. | |
| 2009/0293940 A1 | | 12/2009 | Sharpe | |
| 2009/0314333 A1 | | 12/2009 | Shepard | |
| 2010/0051018 A1 | * | 3/2010 | Ammar et al. | 126/634 |
| 2010/0185333 A1 | * | 7/2010 | Oosting | 700/279 |
| 2010/0326425 A1 | * | 12/2010 | Detch | 126/600 |
| 2011/0048405 A1 | * | 3/2011 | Koetter | F24J 2/14 126/600 |
| 2011/0132434 A1 | | 6/2011 | Correia et al. | |
| 2011/0272003 A1 | | 11/2011 | Elazari | |

(Continued)

*Primary Examiner* — James Lin
*Assistant Examiner* — Liesl C Baumann
(74) *Attorney, Agent, or Firm* — Lambert & Associates; Gary E. Lambert; David J. Connaughton, Jr.

(57) ABSTRACT

A solar collector having two axis control and cogeneration capabilities is provided. The solar collector may have a primary collecting mirror, a second reflecting mirror, and a solar collector positioned adjacent to the primary mirror. The collector may realize both direct solar to electricity production via photovoltaic cells or the like, as well as heat collection generated by the collected solar energy. The collected heat may be transferred to a fluid which may be transferred for productive uses such as electricity production, heating, cooling, and the like.

17 Claims, 11 Drawing Sheets

(56) References Cited

U.S. PATENT DOCUMENTS

2011/0308576 A1    12/2011    Chatterjee et al.
2013/0022727 A1*    1/2013    Sherwin ................ A23L 1/0128 426/523

\* cited by examiner

SOLAR COLLECTING DEVICE

BACKGROUND OF THE INVENTION

1. Field of the Invention

The present invention relates generally to solar collection systems. More particularly, the present invention relates to a solar energy collecting device that uses a two stage mirror to generate both electricity directly as well as heating a heat transfer fluid.

2. Description of Related Art

Solar energy is considered as an alternate source of energy relative to conventional forms of energy. Current solar energy collection systems are used to convert solar energy into electrical energy. The solar energy conversion system typically includes photovoltaic modules, photoelectric cells, or solar cells that convert solar energy into electrical energy for immediate use or for storage and subsequent use. Conversion of solar energy into electrical energy includes reception of light, such as sunlight, at a solar cell, absorption of sunlight into the solar cell, generation and separation of positive and negative charges creating a voltage in the solar cell, and collection and transfer of electrical charges through a terminal coupled to the solar cell.

Solar modules are primarily used in residential and commercial areas i.e. in areas served by a grid of an electric utility company. However, an advantage to solar power is that it may be generated anywhere there is sun, allowing it to be a highly mobile source of energy in remote locations.

The amount of electrical energy generated by the solar module is directly related to the amount of solar energy the cells within a module absorb, which in turn is impacted by the cell efficiency, surface area of cell coverage, and the intensity or brightness of the sunlight that is incident on the cells. Cost of a photovoltaic module increases with increased surface area coverage by the photovoltaic cells. One approach for reducing the cost associated with photovoltaic modules is via optical concentration techniques. By employing optical concentration, the cell coverage area within the laminate is reduced.

The concentrated photovoltaic modules with higher efficiency photovoltaic cells can achieve higher power densities than non-concentrated silicon modules by focusing sunlight to the photovoltaic modules using optical concentration techniques. In other words, higher concentration of sunlight together with the high efficiency photovoltaic cells leads to higher power density. However, increased solar energy concentration leads to heating of the photovoltaic module, resulting in increase of temperature of the photovoltaic material. The increase in temperature of the photovoltaic module decreases efficiency of the photovoltaic module, leading to reduced performance of the photovoltaic module. As a result, effective power generated from the photovoltaic module is limited. Moreover, there is a substantial amount of waste heat created that may be otherwise utilized.

Therefore, what is needed is a solar power generating device that may efficiently and portably generate solar power and that may also utilize heat generated by concentrated solar energy.

SUMMARY OF THE INVENTION

The subject matter of this application may involve, in some cases, interrelated products, alternative solutions to a particular problem, and/or a plurality of different uses of a single system or article.

In one aspect, a solar collecting device is provided. The solar collecting device may comprise a base having a central column and one or a plurality of feet attached to an end of the column. A support shaft may be attached to an opposite end of the column from the feet.

A primary mirror may extend from the support shaft, the mirror having a substantially concave shape formed and/or supported in some embodiments by a plurality of ribs extending from the support shaft. A secondary mirror may be positioned at a focal area of the primary mirror to reflect light from the primary mirror back to a center of the concave shape formed by the primary mirror. In embodiments wherein the primary mirror is trough shaped, the secondary mirror may be long narrow rectangle. In embodiments where the primary mirror is bowl shaped, the secondary mirror may be approximately circular or square shaped.

One or a plurality of solar collectors may be positioned at the center of the primary mirror, likely through a spacing formed by the primary mirror, with the solar collector being below the mirror. The solar collector may be in optical communication with the secondary mirror and positioned to receive a substantial majority of energy reflected from the secondary mirror. The solar collector may comprise a photovoltaic cell array to directly convert solar energy to electricity. Further the solar collector may comprise a heat exchanger configured to allow a heat transfer fluid to gather heat from the solar collector for productive uses.

In another aspect, a kit for assembling a solar collector is provided the kit may comprise a plurality of elements required to assemble the solar collector, packaged in a mobile and durable package. The kit may comprise a central column, a plurality of feet attachable to the column, to form a base. A support shaft may be attachable to the central column.

A primary mirror may be attachable to the support shaft and may extend from the support shaft, the mirror being formed by a plurality of reflective sheets that are slideably mounted between a plurality of ribs, the ribs being attachable to the support shaft. A secondary mirror may be attached to the ribs and/or support shaft and may be positionable at a focal area of the primary mirror. The secondary mirror is configured to reflect light from the primary mirror back to a center of the concave shape formed by the primary mirror. In embodiments wherein the primary mirror is trough shaped, the secondary mirror may be long narrow rectangle. In embodiments where the primary mirror is bowl shaped, the secondary mirror may be approximately circular or square shaped. In one embodiment wherein the mirror is trough shaped, the trough may have a length of 112 inches, an aperture length of 96 inches and a focal length of 36 inches.

A plurality of solar collectors are provided in the kit and are attachable to the support shaft, each of the solar collectors being cylindrically shaped and having a length approximately equal to a spacing between each of the plurality of ribs along the support shaft, each of the plurality of solar collectors being in optical communication with the secondary mirror when attached to the support shaft. Each of the plurality of solar collectors comprise a photovoltaic cell array, wiring attached to the photovoltaic cell array and connectable to an electronic device, a heat exchange aperture passing through the collector, tubing attached to an inlet and an outlet of the aperture, connectable to a pump configured to circulate fluid, and a glass tube at least partially surrounding the photovoltaic cell array, a vacuum being drawn within an annulus formed between the glass tube and the photovoltaic cell array.

Finally the kit may include a dual axis movement device attachable to the solar collecting device to provide movement to the primary mirror. The dual axis movement device may comprise a motor to power the movement device, and a gear box, hydraulic piston, or the like to provide movement to the primary mirror.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a two stage solar collecting device. The device comprises a primary mirror, a secondary mirror, and a solar collector. The present invention may be constructed to be modular, mobile, and easily reparable. Moreover, the present invention utilizes a number of structural optimizations to utilize as much energy from the system as possible and thereby increase efficiency.

The solar collecting device may have a base that provides support for the mirrors, solar collector, and various other components of the device. In one embodiment the base may comprise feet, a central column extending upwards, and a support shaft attached perpendicularly from the central column. In a further embodiment the column and shaft may be hollow to provide a housing and storage area for components, tubing, wires, and the like. Further the central column may be adjustable in height to raise or lower the device.

A plurality of ribs may be attached to or extend from the support shaft. The ribs form a concave shape such as a trough or bowl which provides support and shaping of the primary mirror. In one embodiment, the ribs may be spaced equidistantly along the length of the shaft forming a trough. In a further embodiment, the ribs may be spaced at approximately 12 inch intervals along the length of the support shaft. The ribs may add rigidity to the mirror, provide a uniform shape of the mirror and may ensure a uniform focal line of the parabolic mirror assembly. In another embodiment, the support shaft may be formed as a substantially round block, the ribs protruding therefrom and forming a bowl.

The ribs may be constructed of any material capable of providing rigidity to the mirror and capable of supporting the reflective sheets. In one embodiment, the ribs may be constructed of aluminum. However, other materials contemplated herein may include other metals, high temperature plastics, wood, and the like.

In one embodiment, the ribs may have a precise parabolic curve milled into opposing sides. Reflective sheets may be slideably secured between ribs by being slid into the milled curve of two ribs being secured there between. This embodiment provides a highly accurate, curved mirror formed by the precision milling. Further the reflective sheets of this embodiment may be easily replaceable and easily assembled.

A spacing may be provided in the reflective sheets along a bottom of the concave shape formed by the ribs. In one embodiment, this spacing may be at a bottom of a trough, in line with the support shaft. In this embodiment, this spacing may be formed by a reflective single sheet with an aperture formed therein. In another embodiment one sheet may be inserted on one side of the shaft and may stop at a point nearly to the bottom of the trough, while a second sheet may be inserted on the opposite side of the shaft and may stop at a point nearly to the bottom of the trough. The two sheets forming a spacing. A solar concentration ratio may be determined based on primary mirror width compared to focal point or line width. In one embodiment, this ratio may be approximately 100:1. In another embodiment, this ration may be approximately 240:1.

As such this embodiment primary mirror is trough shaped and formed by the combination of the ribs and reflective sheets attached to the ribs. However, it should be understood that the primary mirror may be formed as a trough or other shape and may be constructed in any manner without straying from the scope of the present invention.

Furthermore, the reflective sheets may be constructed of any material capable of maintaining a relatively uniform shape and capable of mounting to the ribs, either by sliding within the milled groove formed by the ribs, or otherwise. In one embodiment, the reflective sheets are constructed of a stainless steel base layer laminated with a reflective material on at least one side. However, other materials contemplated herein may include other metals, metals laminated with a reflective material, plastics laminated with a reflective material, and the like.

A secondary mirror may be positioned along a focal area formed by the concave primary mirror. In one embodiment, the secondary mirror is configured to redirect the light reflected to the focal line by the primary mirror back to the spacing at the center bottom of the primary mirror. The secondary mirror may be configured to further focus incoming light, or may be flat and simply redirect the incoming light.

The secondary mirror may be any reflective material capable of being suspended above the primary mirror by a support. In one embodiment, the secondary mirror may be milled from an aluminum blank, ground to a final polish, and optionally given an anodized surface treatment.

In one embodiment, the secondary mirror may be supported at its end points by supports extending from various parts of the device such as the support shaft and/or a rib. Support of the secondary mirror may vary depending on size of the mirror and intended operating conditions of the solar collecting device. In a further embodiment, the secondary mirror may be removably attached to the supports, thereby facilitating portability and assembly of the device. In still a further embodiment, the supports may be removably attached to the ribs and/or support shaft.

In another embodiment, the secondary mirror may have an adjustment device to position and reposition the mirror such that it redirects light effectively to the spacing of the primary mirror. In one embodiment the adjustment device may be one or a plurality of threaded connectors and screws, the adjustment being performed by twisting the connector to slowly move the mirror as desired. In another embodiment, the adjustment device may be slideable within a track about certain ranges.

In still another embodiment, the secondary mirror may be configured to absorb heat via a heat sink attached to it. Through the heat sink, one or a plurality of apertures may be formed to allow the flow of a fluid there through. The fluid may be configured to absorb and transfer heat from the heat sink of the mirror. In one embodiment, the fluid flow may be performed by a pump. In another embodiment, this fluid flow may be integrated with the cogeneration fluid flow of the solar collector as discussed below.

A solar collector may be positioned within the support shaft, and may be oriented to receive the solar energy reflected and focused by the primary mirror, and redirected by the secondary mirror through the spacing of the primary mirror. In one embodiment, the support shaft may form an aperture in line with the spacing of the primary mirror. This configuration of the solar collector may enhance durability, ease of assembly, and maintenance of the device. The solar collector may be any device capable of receiving and transferring the solar energy collected by the device.

In one embodiment, the solar collector may be a heatable conduit. In this embodiment, heat generated by the concentrated solar energy directed to the solar collector may be transferred for use in productive applications, such as building heat, boiling water for desalination or electricity production, and the like.

In another embodiment, the solar collector may be a photovoltaic (PV) cell array. Photovoltaic cells allow conversion of solar energy to electricity. In this embodiment, wires may carry electricity produced directly to electronic devices, batteries or other electronic storage, or to a local power grid. PV cells contemplated herein may be single junction cells, triple junction cells, or any other unit capable of conversion of light energy into electricity.

In still another embodiment, the solar collector may be a cogeneration device, utilizing both a PV cell array, and a heat transfer system. In this embodiment, the heat transfer system may serve two purposes: the first is to utilize waste heat absorbed by the PV array, and the second is to maintain the PV array at an optimal working temperature of approximately 25 degrees Celsius, thereby maximizing PV cell efficiency. It should be understood that there may be different temperatures to substantially maximize operating efficiency depending on the configuration of the PV array.

Solar collectors may be constructed of various materials depending on the type of use. Generally the solar collectors may be constructed of metals, heat resistant plastics, glass, ceramics, or combinations thereof.

In cogeneration embodiments, the solar collector may comprise a PV cell array, a fluid flow system having inlet and outlet tubing, and electrical wiring. Further, a glass covering or tube may encase these elements. The glass may partially or fully encase the collector. In one embodiment a full glass tube may encircle the collector. In another embodiment, a glass plate may be placed over the PV cell array, and sealed to an encasing material such as a metal or plastic tube.

A vacuum may be drawn within the glass tube which may maximize insulation, properly modulate temperature of the PV cells, and limit oxygen exposure to the PV cells. In a further embodiment, caps may be provided on each end to seal the tube. The caps may be easily removed to allow access to the internal structure of the solar collector. In still a further embodiment, the electrical, fluid, and vacuum flows may be mounted to one or both of the caps. In another embodiment, in addition to the vacuum drawn on the solar collector, a supplemental vacuum may be drawn within the support shaft to provide further insulation to components therein.

In one embodiment, the cogeneration fluid may travel through dual coaxial tubing. In this embodiment, the fluid may travel through an interior tube, and an exterior tube may be used for drawing and maintaining a vacuum within the glass tube of the solar collector. As such the cogeneration fluid may be further insulated by the vacuum surrounding it in the tube. In a further embodiment, the cogeneration fluid tubing may be kept within the support shaft and base column for as long as possible until exiting the device for use. Embodiments which contain the fluid tubing internally may provide added efficiency particularly in cold weather environments by providing additional insulation to the fluid.

A vacuum pump may be attached to the tubing to draw the vacuum above discussed. In one embodiment, the vacuum pump may utilize electricity generated by the PV array directly.

The solar collector may be configured to be modular, easily installable and easily replaceable. In one embodiment, a plurality of solar collectors may be used along the length of the solar collector. In a further embodiment, one solar collector may be positioned between each set of ribs. In this embodiment, the solar collectors may be easily removed for repair or replacement while still allowing the functioning solar collectors to operate properly. In still a further embodiment, the electronics and/or tubing may be installed in parallel such that failure of one of the plurality of solar collectors does not impair functionality of the others.

In a further embodiment, the solar collector may be installed by snapping into place. Further, the inputs to the solar collector such as fluid flow, electric flow and vacuum tubing may be easily connected by, for example, snap in fittings, pressure fittings, swage fittings, threaded fittings, and the like.

The solar collecting device may further comprise a dual axis adjustment mechanism. This mechanism may move the primary mirror left to right and also angle it upwards and downwards. This allows the mirror to track the movement of the sun throughout the day to ensure that the mirror is receiving a maximum amount of sunlight. The dual axis adjustment mechanism may utilize any structure to allow movement. In one embodiment, gearing may operate to achieve the desired motion. In another embodiment, hydraulics may move the mirror. In still another embodiment gas pistons may be utilized.

In one embodiment, a single device may control the side to side motion and the up and down angled motion. In another embodiment, different devices may control the side to side motion and the up and down motion. For example, the dual axis adjustment mechanism may have a hydraulic pump which may control two pistons, one to control left to right movement of the primary mirror, and another to control up and down angling of the primary mirror.

In a further embodiment, a computer may be programmed and configured to control the dual axis adjustment mechanism. In still another embodiment, the computer may automatically calculate optimal mirror tracking based on, for example, latitude and longitude, time, and/or date. In one embodiment, a global positioning system may be utilized to provide this data to the computer. The computer may utilize this calculated tracking to activate the adjustment mechanism to cause the mirror to follow this optimal track.

The present invention is configured to be easily set up, maintained and used. In one embodiment, assembly and use of the present invention may begin by attaching feet and the support shaft to the central column. The feet can be secured to the ground by resting on flat ground, or being secured to the ground by stakes and the like. A support shaft may be mounted to the central column. The plurality of ribs may be attached to the support shaft to form the trough or bowl shape of the primary mirror. Next, reflective sheets may be disposed between the ribs to form the primary mirror. The secondary mirror may be attached to the support shaft and/or ribs and aligned on the focal area formed by the primary mirror. The secondary mirror may then be configured to direct energy to the solar collector which is secured within the support shaft and accessible to light and other solar energy by a spacing in the mirror and an aperture formed by the support shaft. One or a plurality of solar collectors may be removably attached within the support shaft. The solar collector may be easily connected to tubing and wiring to allow the flow of electricity and heat transfer fluid out of the collector. This wiring and tubing may travel within the support shaft, through the central column, and out of the device to its destination. In a further embodiment, a computerized tracking system may control a two axis adjustment mechanism to track the sun's movement along two axes.

In one embodiment of maintenance, in the event that one of a plurality of solar collectors is damaged, the present invention allows for a new solar collector to be easily installed. The damaged collector may be removed by disconnecting a tubing and/or wiring, and disconnecting it from its position within the support shaft. The new solar collector may then be installed by connecting it to the open position within the support shaft, and then connecting the disconnected tubing and wiring. In some modular designs and kits, one or multiple spare solar collectors may be provided for easy replacement and minimal downtime if an operating solar collector is damaged. Further, the device may have a storage area to store spare solar collectors.

Other examples of the use of various embodiments of the present invention may include air dropping into remote locations, flat packing for remote assembly, inclusion in payloads on remote travel vehicles, and the like.

Figure 1:
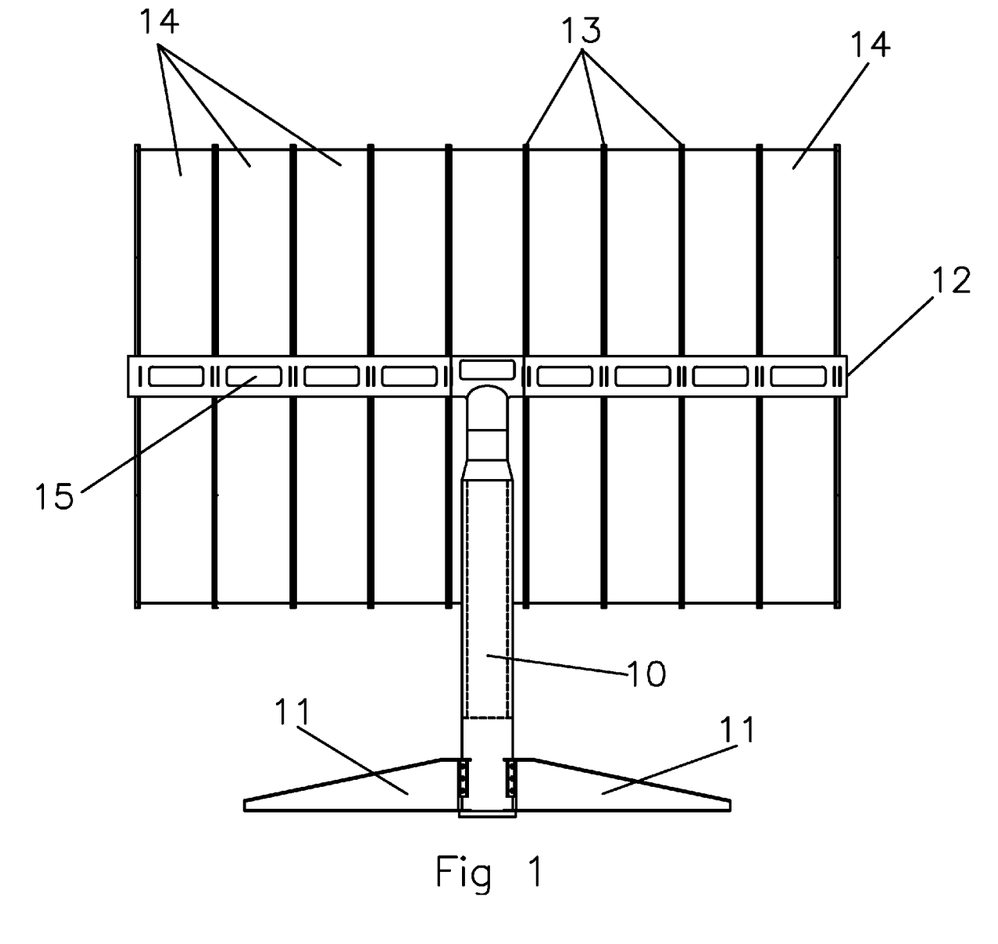
FIG. 1 provides a rear view of an embodiment of the present invention is provided.

Turning now to FIG. 1, a rear view of an embodiment of the present invention is provided. A central column 10 is connected at a base end to a plurality of feet 11. At an opposite end, the column 10 is attached to a support shaft 12. The support shaft 12 comprises a series of access panels 15 to allow access to a solar collector (not shown), the solar collector being disposed therein. A plurality of ribs 13 extend radially from the length of the support shaft 12. Between each of the ribs 13 are reflectors 14 which are secured between each rib 13. The reflectors 14 forming a primary mirror.

Figure 2:
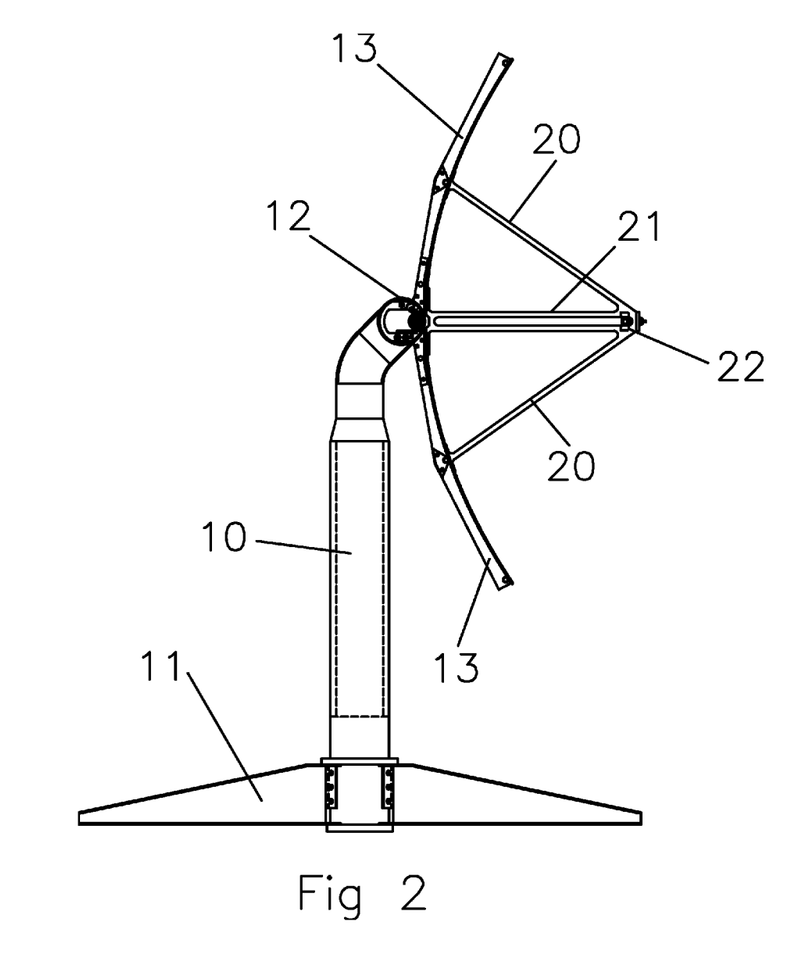
FIG. 2 provides a side view of an embodiment of the present invention.

FIG. 2 shows a side view of an embodiment of the present invention. A central column 10 is connected at a base end to a plurality of feet 11. At an opposite end, the column 10 is attached to a support shaft 12. A dual axis movement device is attached to the support shaft 12. The dual axis movement device is shown as a motor that provides angular and axial movement of a primary mirror (not shown). A plurality of ribs 13 extend radially from the length of the support shaft 12. A secondary mirror 22 is spaced away from the primary mirror and positioned at a focal line of the curved primary mirror. The secondary mirror 22 is supported by side supports 20 and a central support 21. An adjuster is positioned by the secondary mirror 22. The adjuster allows for adjustment of the orientation of the secondary mirror 22. In this embodiment, the support shaft 12 is pivotally attached to the central column 10 so as to allow the primary mirror to track solar position. Moreover, in this embodiment, the central column 10 is telescoping, having a portion extending into its bottom portion, as shown in broken lines.

Figure 3:
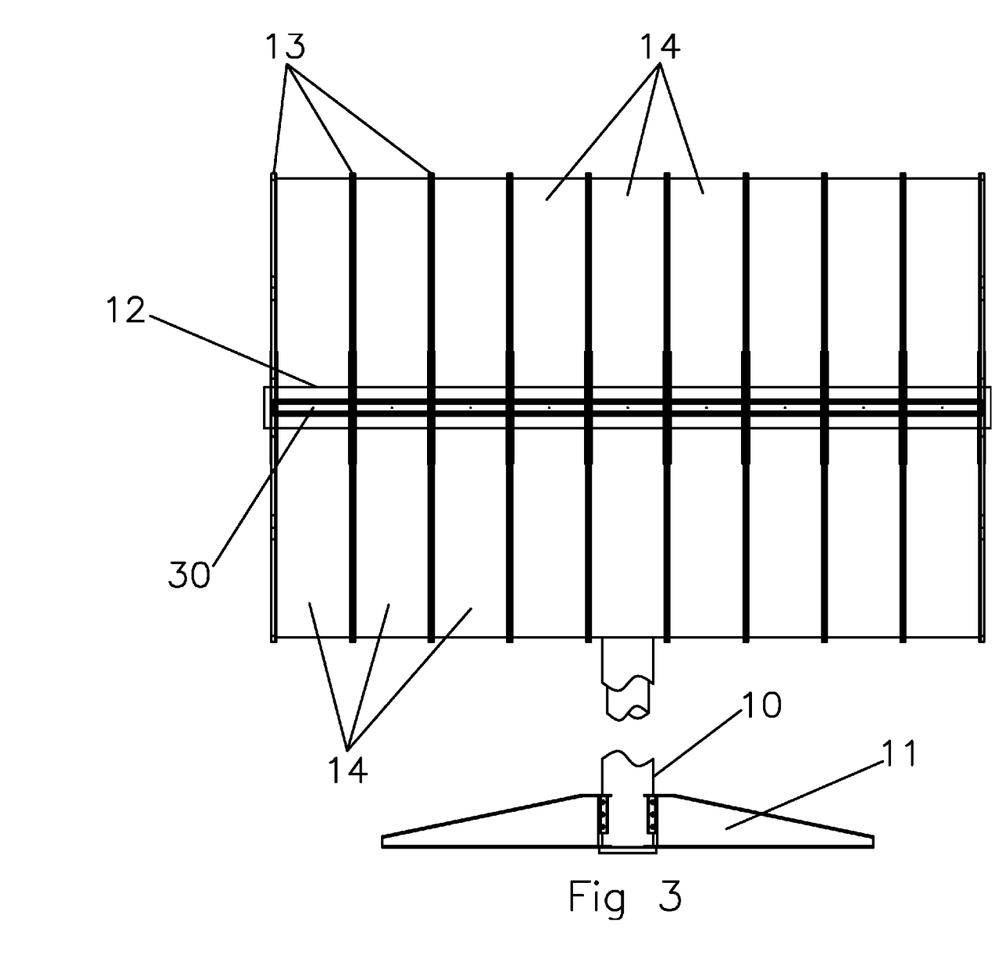
FIG. 3 provides a frontal view of an embodiment of the present invention with the secondary mirror removed.

FIG. 3 provides a frontal view of an embodiment of the present invention with the secondary mirror removed. A central column 10 is connected at a base end to a plurality of feet 11. A plurality of ribs 13 extend radially from the length of the support shaft 12. Between each of the ribs 13 are reflectors 14 which are secured between each rib 13. The reflectors 14 forming a primary mirror. At a center of each reflective sheet 14 is a spacing 30 which allows light to pass through.

Figure 4:
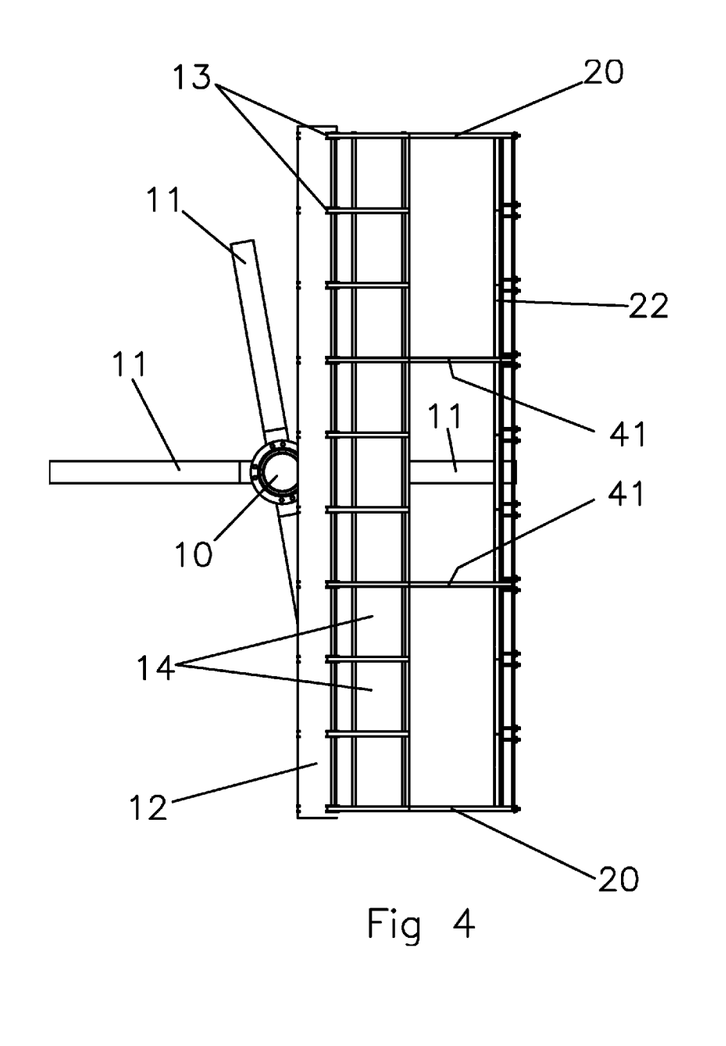
FIG. 4 provides a top view of another embodiment of the present invention.

FIG. 4 provides a top view of another embodiment of the present invention. A central column 10 is connected at a base end to a plurality of feet 11. At an opposite end, the column 10 is attached to a support shaft 12. A plurality of ribs 13 extend radially from the length of the support shaft 12. Between each of the ribs 13 are reflectors 14 which are secured between each rib 13. The reflectors 14 forming a primary mirror. A secondary mirror 22 is spaced away from the primary mirror and positioned at a focal line of the curved primary mirror. The secondary mirror 22 is supported by side supports 20 and a central support 21, and 41.

Figure 5:
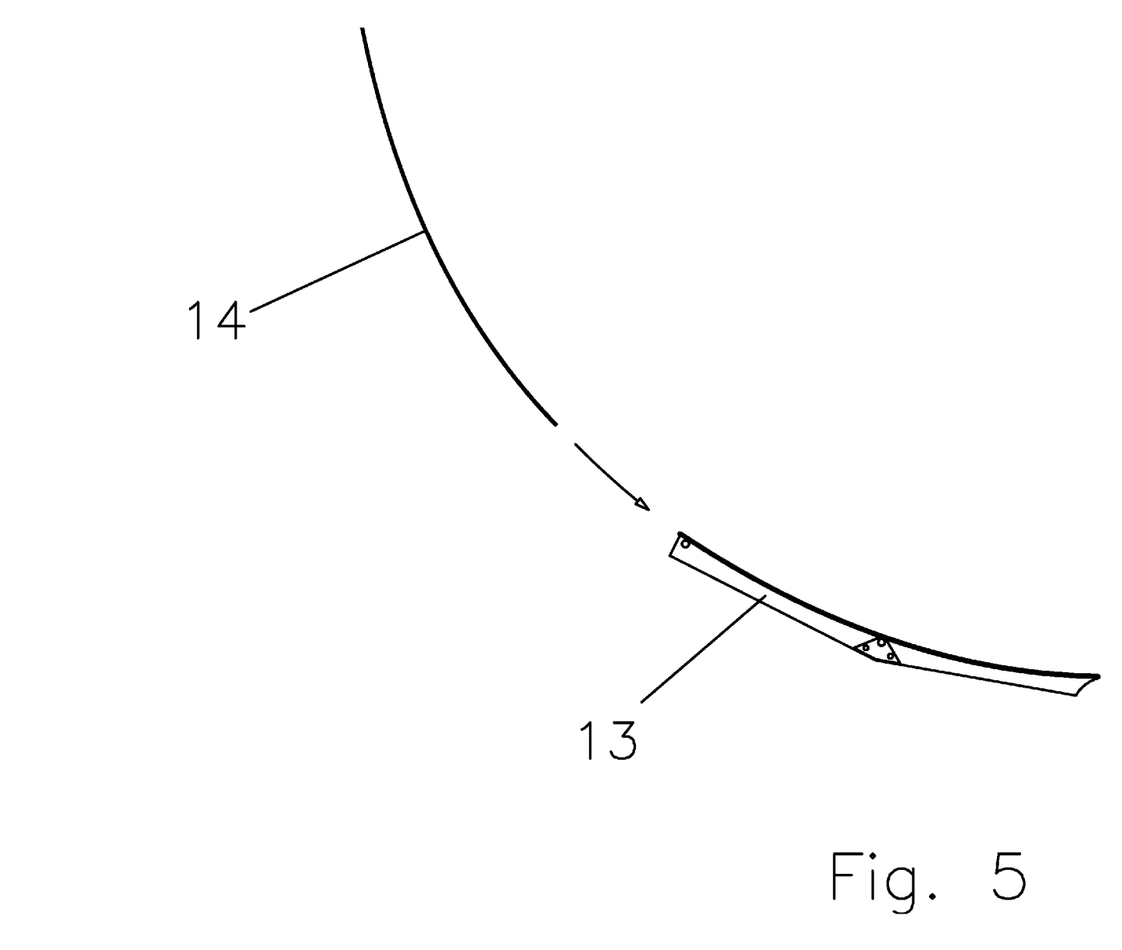
FIG. 5 provides a side view of one embodiment of the primary mirror.

FIG. 5 provides a side view of one embodiment of the primary mirror. A rib 13 is shown from its side. A reflective sheet 14 is shown removed. The rib 13 is configured to slideably receive the reflective sheet 14.

Figure 6:
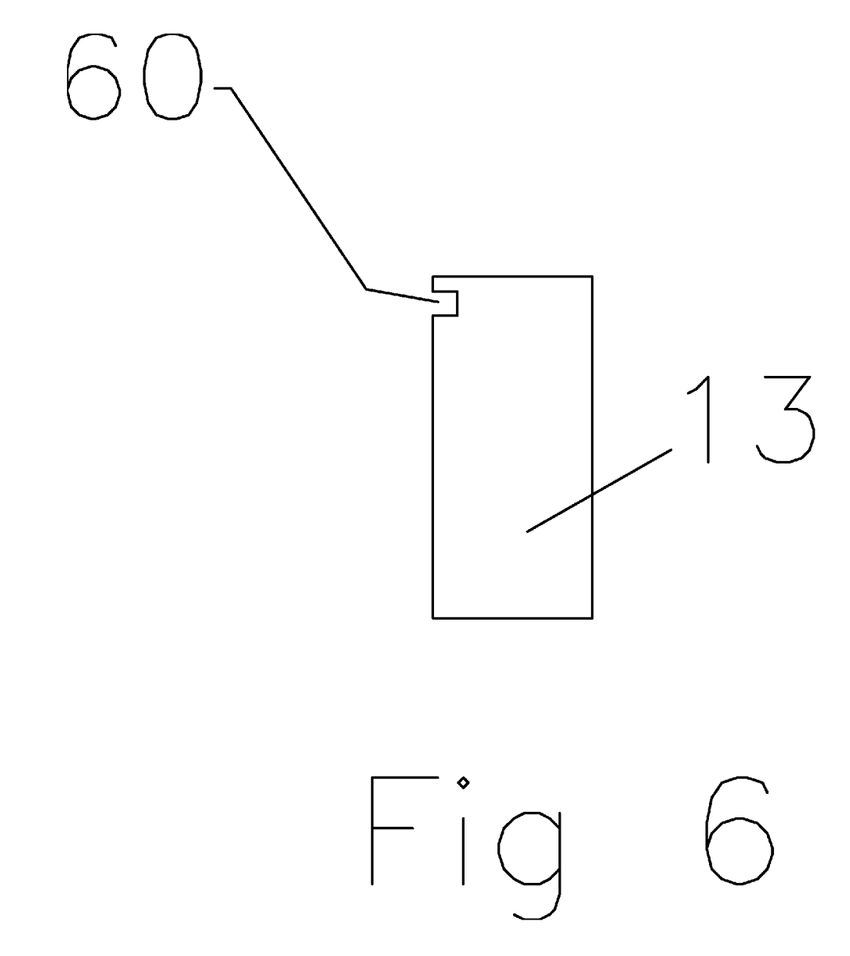
FIG. 6 provides a detail cross sectional view of a rib.

FIG. 6 provides a detail cross sectional view of a rib. The rib 13 is formed with a groove 60 formed into a top inner portion. This groove 60 is sized to receive an end of a reflective sheet (not shown).

Figure 7:
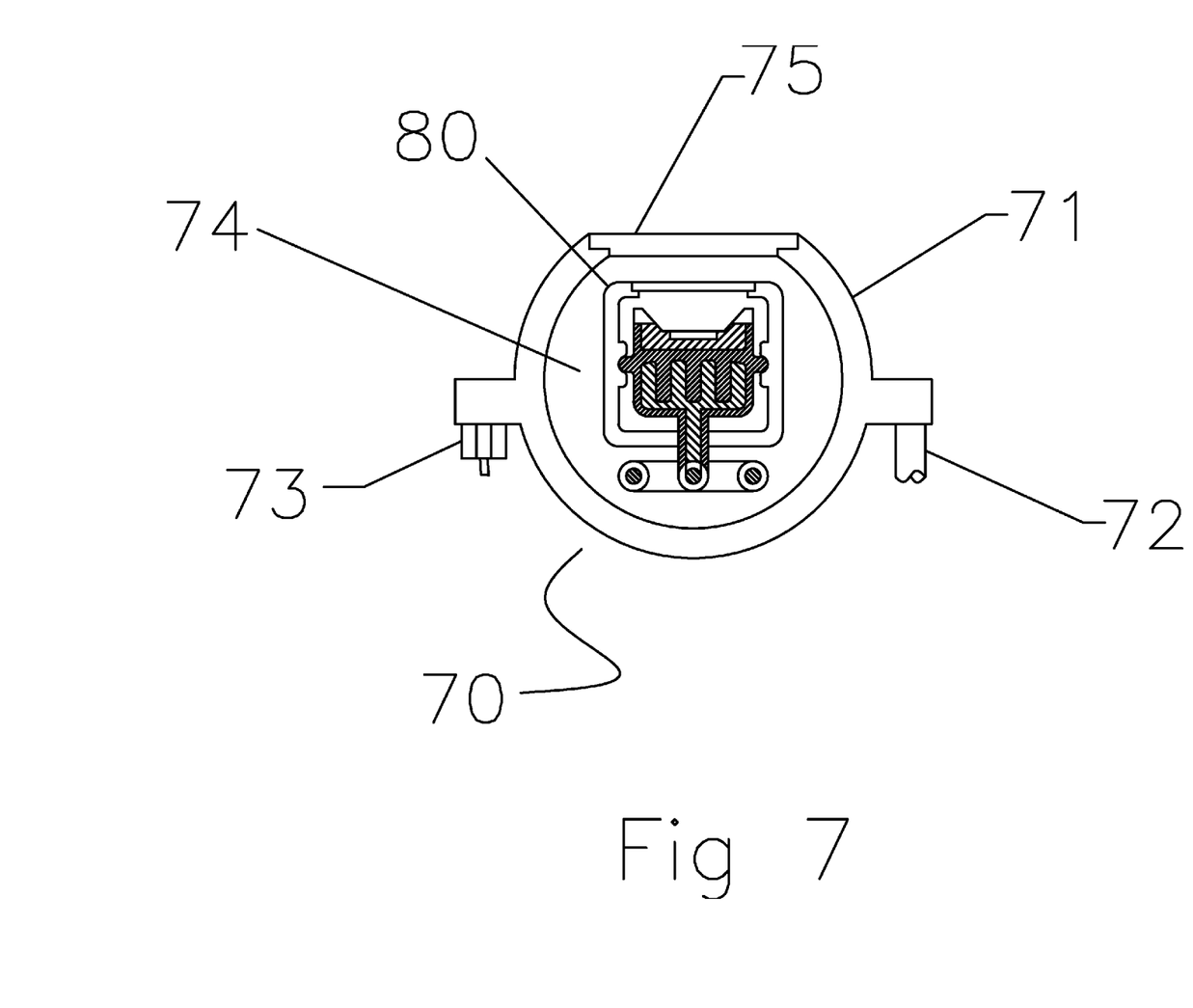
FIG. 7 provides a cross sectional side view of an embodiment of the solar collector.

FIG. 7 provides a cross sectional side view of an embodiment of the solar collector. The solar collector 70 comprises a case 71 to which a tube 72 is attached. The tube may provide vacuum and/or heat transfer fluid flow to the interior of the case 71. A plug 73 is also connected to the case 71, the plug 73 providing electrical communication to between the photovoltaic array 80 and an outside electrical connection (not shown). The photovoltaic array 80 is positioned centrally within the interior 74 of the case 71. A top of the case 71 is provided with a glass or other transparent cover 75 to allow passage of light from an exterior of the case 71 to the photovoltaic array 80.

Figure 8:
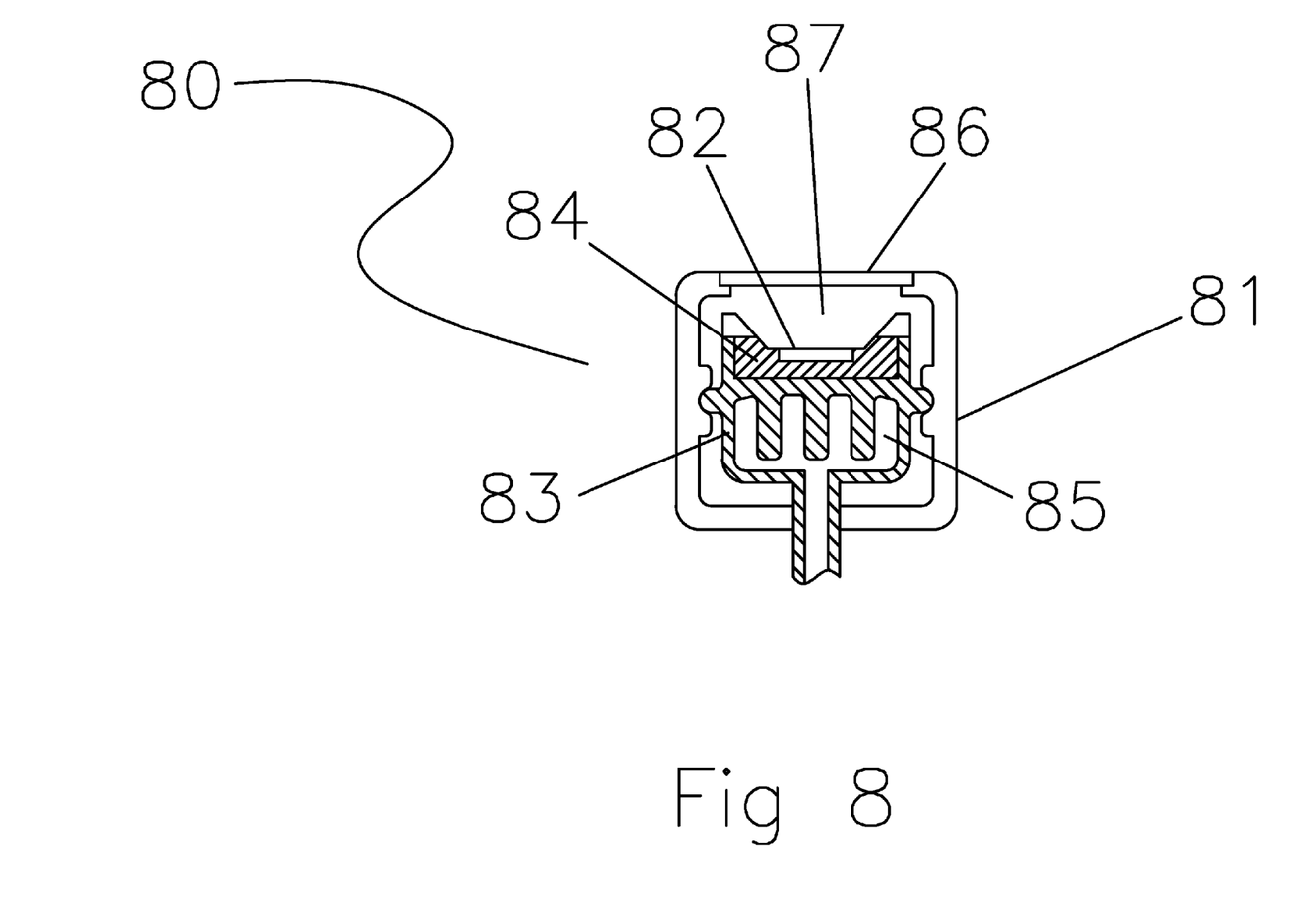
FIG. 8 provides a cross sectional view of the photovoltaic array.

FIG. 8 provides a cross sectional view of the photovoltaic array. The photovoltaic array 80 comprises a casing 81 which retains the photovoltaic cell 82, cell support 84, and heat transfer casing 83. An aperture 85 is formed by the heat transfer casing 83 to allow fluid flow in and/or out of the casing 83. A glass or other transparent cover 86 is positioned above the photovoltaic cell 82 which allows light to pass through the cover 86 and reach the photovoltaic cell 82. An annular space 87 is provided between the case 81 and the heat transfer casing 83. A vacuum may be drawn within this annular space 87.

Figure 9:
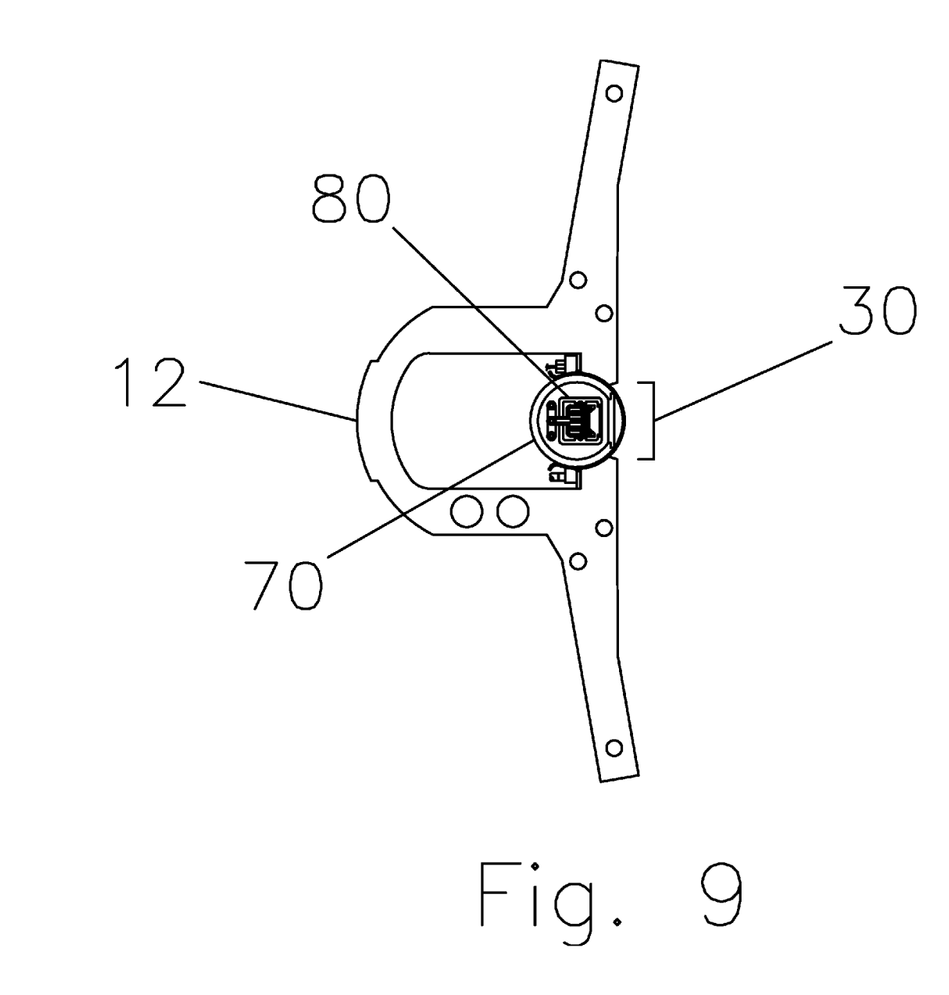
FIG. 9 provides a cross sectional view of the support shaft with the solar collector disposed therein.

FIG. 9 provides a cross sectional view of the support shaft with the solar collector disposed therein. The support shaft 12 forms an interior section, as well as mount points for the ribs (not shown). Further, the support shaft is configured to receive the solar collector 70, the solar collector 80 having the photovoltaic array 80 disposed therein. A spacing 30 is formed by the support shaft 12 and any reflective sheets forming the primary mirror (not shown). This spacing 30 allows light to access the photovoltaic cell array 80.

Figure 10:
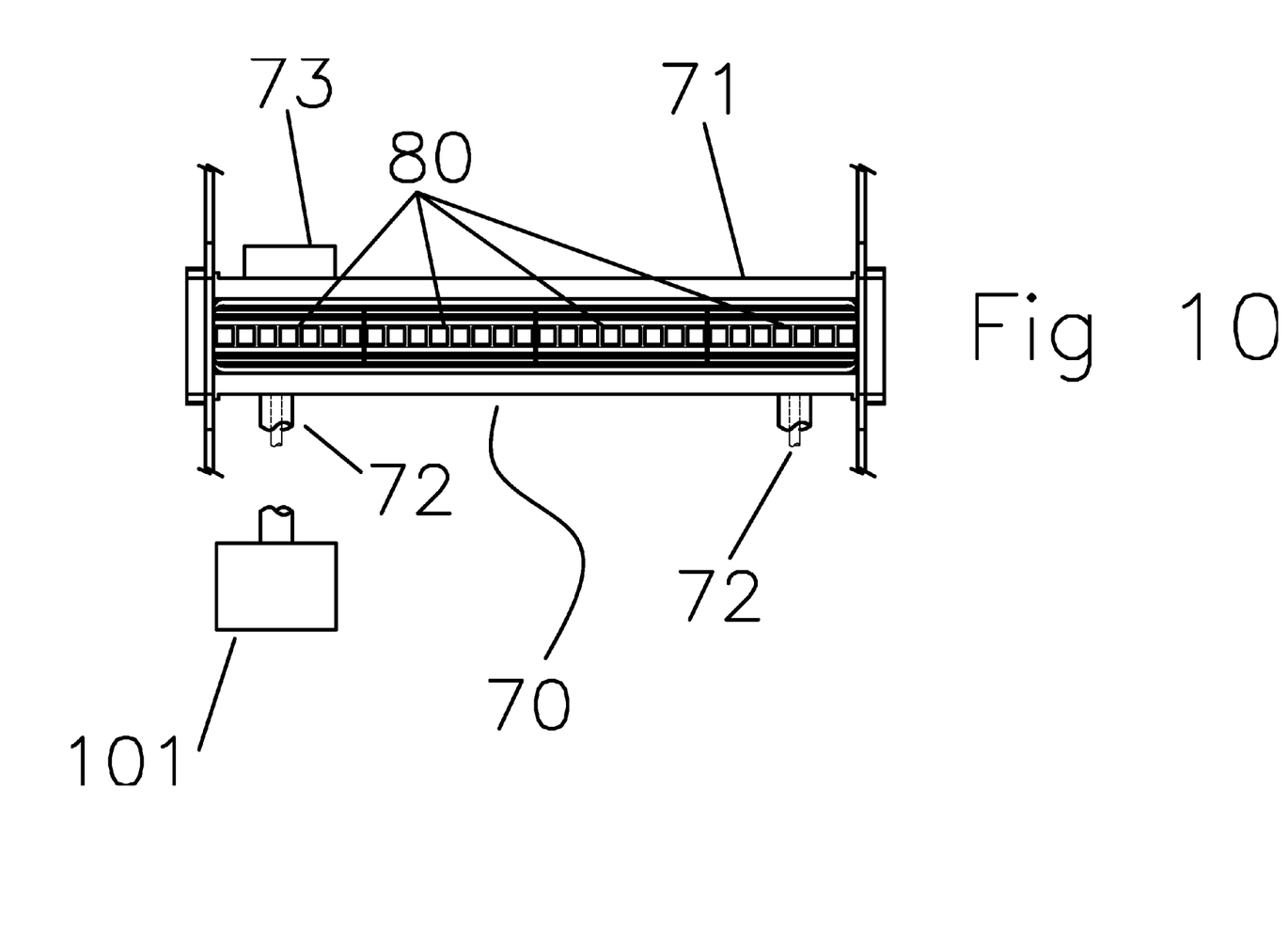
FIG. 10 provides an elevation view of the solar collector.

FIG. 10 provides an elevation view of the solar collector 70. A plurality of photovoltaic arrays 80 can be seen lined up along the length of the casing 71. A plug 73 extends from the casing 71 to provide electrical communication between the photovoltaic arrays 80 and an outside of the casing 71. Two tubes 72 extends from the casing 71 and may provide vacuum and/or heat transfer fluid to an interior of the casing and the photovoltaic arrays 80. The tubes 72 are coaxial tubes, having an interior and an exterior tube. A vacuum pump 101 provides a vacuum to an interior of the casing 71, and is connected to an exterior tube of the coaxial tube 72.

Figure 11:
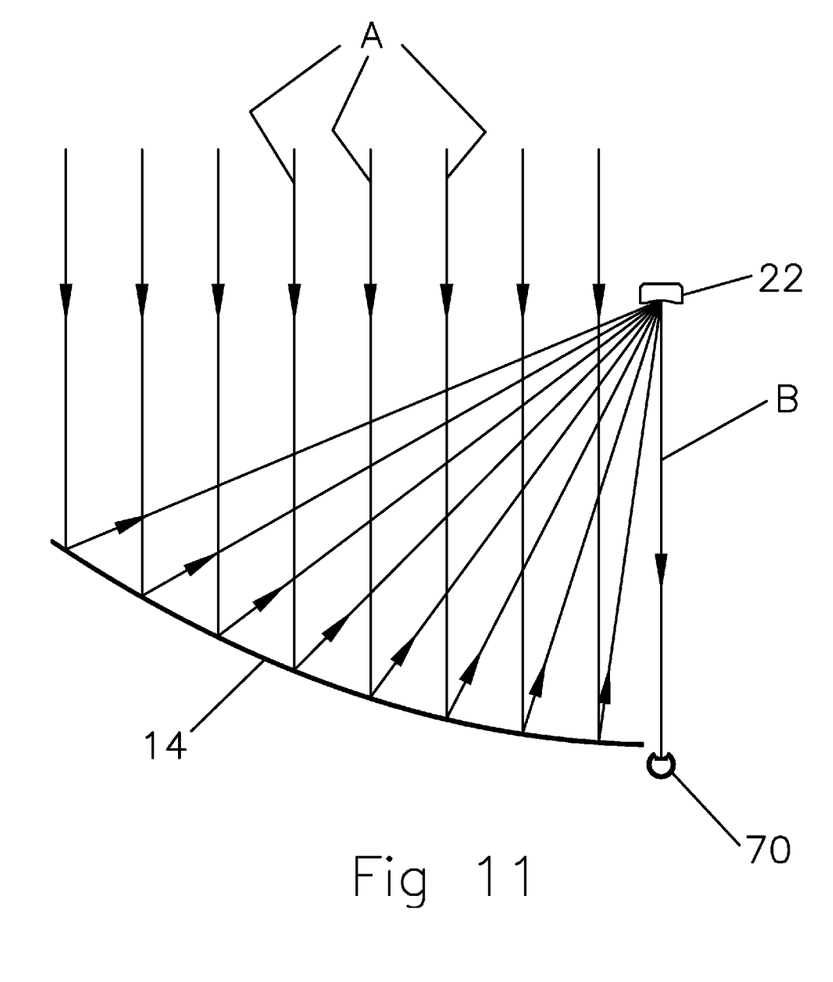
FIG. 11 provides a cross sectional view of the present invention demonstrating an embodiment of solar energy capture.

FIG. 11 provides a cross sectional view of the present invention demonstrating an embodiment of solar energy capture. Incident sunlight 'A' is reflected by the primary mirror 14. Based on the curvature of the primary mirror 14 the light is approximately directed to a single point or line. A secondary mirror 22 is positioned at this point or along this line. The secondary mirror 22 reflects all received light along path 'B' towards the solar collector 70. As such, light received by the primary mirror 14 is concentrated and focused at the solar collector 70.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A solar collecting device comprising:
   a base, the base comprising a central column;
   a support shaft attached to a distal end of the central column, the support shaft oriented substantially perpendicularly to the central column;
   a plurality of ribs attached to the support shaft and extending from the support shaft, each of the plurality of ribs positioned along a length of the support shaft and extending perpendicularly to a major axis of the support shaft, each of the plurality of ribs spaced apart from each other;
   each of the plurality of ribs further comprising a groove on two opposing lengthwise sides;
   a plurality of reflective sheets, each of the plurality of reflective sheets configured to be slideably mounted in a spacing defined by two adjacent of the plurality of ribs, and held in place partially within the groove of one of the plurality of ribs and the groove of the adjacent one of the plurality of ribs, the plurality of reflective sheets combining to form a primary mirror;
   a secondary mirror attached to the solar collecting device and positioned at a focal area formed by the primary mirror;
   a solar collector in optical communication with the secondary mirror, the solar collector comprising:
      a photovoltaic cell array mounted to the solar collector in optical communication with the secondary mirror;
      a wiring providing electronic communication between the photovoltaic cell array and an outlet positioned on an exterior of the solar collector;
      a heat transfer unit providing heat transfer between the solar collector and a heat transfer fluid, the heat transfer unit having a fluid inlet and a fluid outlet; and
      a casing surrounding the photovoltaic cell array, wherein the casing comprises glass, and the casing is disposed within and in direct physical contact with the support shaft.

2. The solar collecting device of claim 1 further comprising a dual axis movement device constructed and arranged to move the primary mirror in an axial direction and to adjust an angle of the primary mirror in relation to the central column.

3. The solar collecting device of claim 2 further comprising a computer, the computer configured to electronically activate the dual axis movement device based on a position of the Sun.

4. The solar collecting device of claim 1 wherein the solar collector further comprises a vacuum drawn on an interior of the casing.

5. The solar collecting device of claim 4 wherein the fluid inlet and the fluid outlet are dual coaxial tubes, the heat transfer fluid flow being through an interior tube of the dual coaxial tube, and a vacuum being drawn on an exterior tube of the dual coaxial tube surrounding the interior tube; the device further comprising:
   a vacuum pump in communication with the exterior tube of at least one of the fluid inlet coaxial tube or the fluid outlet coaxial tube, the vacuum pump constructed and arranged to draw a vacuum on the interior of the casing via the exterior tube of the at least one of the inlet tube or the outlet tube.

6. The solar collecting device of claim 4 wherein a flow of the heat transfer fluid through the heat transfer unit maintains the photovoltaic array at a temperature to substantially maximize operating efficiency.

7. The solar collecting device of claim 1 further comprising an adjuster attached to the secondary mirror, the adjuster allowing movement of the secondary mirror to direct a quantity of light from the primary mirror, through the spacing formed by the primary mirror, to the solar collector.

8. The solar collecting device of claim 1 wherein a heat energy transferred to the heat transfer fluid by the solar collector is utilized for at least one of: electricity production, building heat production, water desalination, water distillation, water condenser, air conditioning, and boiling water.

9. The solar collecting device of claim 1 wherein the support shaft further comprises an access panel to allow removal of the solar collector, the solar collector being disposed therein.

10. The solar collecting device of claim 1 further comprising:
    a heat sink in communication with the secondary mirror; and
    a quantity of fluid configured to flow through an inlet tube, through the heat sink, and out an outlet tube, the fluid configured to absorb a quantity of heat from the secondary mirror.

11. The solar collecting device of claim 1 further comprising a pump, the pump configured to convey the quantity of fluid through the heat transfer unit of the solar collector.

12. The solar collecting device of claim 1 wherein the base further comprises a plurality of feet attached to a proximal end of the central column, each of the plurality of feet securable by a stake to the ground.

13. A solar collecting device comprising:
    a base, the base comprising a central column;
    a support shaft attached to a distal end of the central column, the support shaft oriented substantially perpendicularly to the central column;
    a plurality of ribs attached to the support shaft and extending away from the support shaft, each of the plurality of ribs positioned along a length of the support shaft and extending perpendicularly to a major axis of the support shaft, each of the plurality of ribs spaced apart from each other;
    each of the plurality of ribs further comprising a groove on two opposing lengthwise sides;

a plurality of reflective sheets, each of the plurality of reflective sheets configured to be slideably mounted in a spacing defined by two adjacent of the plurality of ribs, and held in place partially within the groove of one of the plurality of ribs and the groove of the adjacent one of the plurality of ribs, the plurality of reflective sheets combining to form a primary mirror;

at least one secondary mirror attached to the solar collecting device and positioned at a focal area formed by the primary mirror;

a plurality of solar collectors attached to the support shaft, each one of the plurality of solar collectors having a length approximately equal to the spacing between two of the plurality or ribs, and attached to the support shaft to be approximately aligned with each of the spacings defined by the plurality of ribs, each of the plurality of solar collectors in optical communication with the at least one secondary mirror, each of the solar collectors constructed and configured to absorb and transfer a quantity of energy received from the at least one secondary mirror, and comprising:

a photovoltaic cell in optical communication with the at least one secondary mirror;

a wiring providing electronic communication between the photovoltaic cell and an outlet positioned on an exterior of the solar collector;

a heat transfer unit configured to provide heat transfer between the solar collector and a heat transfer fluid, the heat transfer unit having a fluid inlet and a fluid outlet; and a casing surrounding the photovoltaic array, wherein the casing comprises glass, and the casing is disposed within and in direct physical contact with the support shaft.

14. The solar collecting device of claim 13 wherein each of the plurality of solar collectors further comprises a vacuum drawn within an interior of the casing; and wherein the fluid inlet and the fluid outlet are dual coaxial tubes, the heat transfer fluid flow being through an interior tube, and a vacuum being drawn on an exterior tube surrounding the interior tube, the device further comprising:

a vacuum pump in communication with the exterior tube of at least one of the fluid inlet coaxial tube or the fluid outlet coaxial tube, the vacuum pump constructed and arranged to draw a vacuum on the interior of the casing via the exterior tube of the at least one of the inlet tube or the outlet tube.

15. The solar collecting device of claim 13 further comprising a dual axis movement device constructed and arranged to move the primary mirror in an axial direction and to adjust an angle of the primary mirror in relation to the central column.

16. The solar collecting device of claim 13 further comprising an adjuster attached to the at least one secondary mirror, the adjuster allowing movement of the at least one secondary mirror to direct a quantity of light from the primary mirror, through the spacing formed by the primary mirror, to the plurality of solar collectors.

17. The solar collecting device of claim 13 further comprising:

a heat sink in communication with the at least one secondary mirror; and a quantity of fluid configured to flow through an inlet tube, to the heat sink, and out an outlet tube, the fluid configured to absorb a quantity of heat from the at least one secondary mirror.

* * * * *